(12) United States Patent
Chen

(10) Patent No.: US 9,571,844 B2
(45) Date of Patent: Feb. 14, 2017

(54) IMAGE PROCESSOR

(71) Applicant: MegaChips Corporation, Osaka-shi (JP)

(72) Inventor: Handa Chen, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/574,645

(22) Filed: Dec. 18, 2014

(65) Prior Publication Data

US 2015/0189288 A1    Jul. 2, 2015

(30) Foreign Application Priority Data

Dec. 26, 2013 (JP) .................................. 2013-268652

(51) Int. Cl.
H04N 19/176 (2014.01)
H04N 19/115 (2014.01)
H04N 19/14 (2014.01)
H04N 19/124 (2014.01)

(52) U.S. Cl.
CPC .......... H04N 19/176 (2014.11); H04N 19/115 (2014.11); H04N 19/14 (2014.11); H04N 19/124 (2014.11)

(58) Field of Classification Search
CPC ...... H04N 19/176; H04N 9/045; H04N 5/367; H04N 5/3675; H04N 2209/046; H04N 2209/049; G06T 2207/20182; G06T 5/001; G06T 5/005; G06T 3/4015; G06T 5/002; G06T 5/003; G06T 2207/30168
See application file for complete search history.

(56) References Cited

U.S. PATENT DOCUMENTS

| 6,606,415 | B1 * | 8/2003 | Rao | G06T 9/00 382/228 |
| 6,724,817 | B1 * | 4/2004 | Simpson | H04N 1/333 375/240.07 |
| 2001/0048769 | A1 * | 12/2001 | Kajiki | H04N 19/176 382/239 |
| 2002/0097172 | A1 * | 7/2002 | Fallon | G06T 9/00 341/51 |
| 2002/0102027 | A1 * | 8/2002 | Miyake | H04N 19/15 382/239 |
| 2003/0169934 | A1 * | 9/2003 | Naito | H04N 19/176 382/239 |
| 2007/0269118 | A1 * | 11/2007 | Sasaki | H04N 19/70 382/232 |
| 2008/0037880 | A1 * | 2/2008 | Lai | H04N 19/172 382/232 |
| 2012/0121013 | A1 * | 5/2012 | Lainema | H04N 7/32 375/240.12 |

(Continued)

FOREIGN PATENT DOCUMENTS

JP    2009-212800    9/2009

Primary Examiner — Jingge Wu
(74) Attorney, Agent, or Firm — Oblon, McClelland, Maier & Neustadt, L.L.P.

(57) ABSTRACT

An analyzing unit sets a threshold on the basis of a target compression ratio of a frame. The compression unit compresses a block having an attribute value larger than or equal to a threshold by applying a first compression format and a block having an attribute value smaller than the threshold by applying a second compression format having a higher compression ratio than the first compression format.

14 Claims, 3 Drawing Sheets

(56) References Cited

U.S. PATENT DOCUMENTS

2014/0098114 A1\* 4/2014 Ju ............................ G06T 9/00
  345/520
2015/0085943 A1\* 3/2015 Taniguchi ................ H04N 5/21
  375/240.29

\* cited by examiner

IMAGE PROCESSOR

CROSS REFERENCE TO RELATED APPLICATIONS

The present application is based on, and claims priority from Japanese Patent Application Serial Number 2013-268652, the disclosure of which is hereby incorporated by reference herein in its entirety.

BACKGROUND

Technical Field

The present disclosure relates to image processors, and more particularly, to an image processor that compresses a still picture to be compressed in a block unit.

Related Art

In accordance with one technique, an image processor includes a compression unit that compresses an image to be compressed, a frame buffer for storing a compressed image compressed by the compression unit, and a decompression unit that decompresses a compressed image output from the frame buffer.

JP2009-212800A describes an image compression device that compresses an image to be compressed in a unit of a block having a predetermined number of pixels, employing Block Truncation Coding (BTC) compression.

Recent cameras and televisions have rapidly improved in resolution, which increases occasions to process images having a large number of pixels in image compression of still pictures. Processing an image to be compressed having a large number of pixels requires a large-capacity, high-bandwidth frame buffer, resulting in higher product cost. On the other hand, compression with excessively high compression ratio to reduce buffer capacity and data transfer rate leads to significant degradation in image quality.

SUMMARY

The present disclosure is directed to an image processor that reliably realizes a target compression ratio to reduce buffer capacity, and minimizes image degradation due to compression to improve image quality.

An image processor according to an aspect of the present disclosure compresses a still picture with a configuration including a block having multiple pixels, a group of blocks having multiple blocks, and a frame having multiple groups of blocks. The image processor includes a first data storage that sequentially stores a group of blocks, a compression unit that compresses a group of blocks to be compressed stored in the first data storage, an analyzing unit that analyzes the group of blocks to be compressed, and a second data storage that stores a plurality of groups of blocks sequentially compressed by the compression unit to store a compressed frame. The analyzing unit sets a first threshold on the basis of a target compression ratio of a frame. The compression unit compresses, among the group of blocks to be compressed, a block having an attribute value larger than or equal to the first threshold by applying a first compression format, and a block having an attribute value smaller than the first threshold by applying a second compression format having a higher compression ratio than the first compression format.

These and other objects, features, aspects and advantages of the present disclosure will become more apparent from the following detailed description when taken in conjunction with the accompanying drawings.

DETAILED DESCRIPTION

Figure 1:
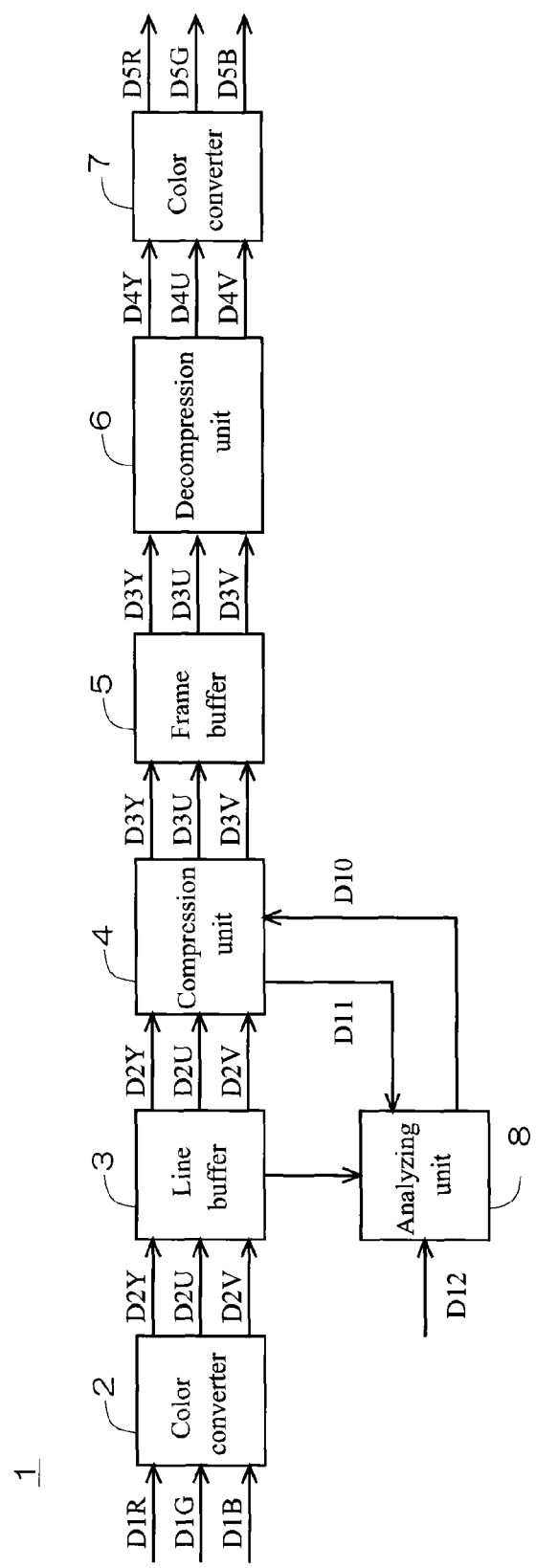
FIG. 1 is a block diagram illustrating a configuration of an image processor according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

According to an aspect of an image processor, an analyzing unit sets a first threshold on the basis of a target compression ratio of a frame. A compression unit compresses a block having an attribute value larger than or equal to the first threshold by applying a first compression format, and a block having an attribute value smaller than the first threshold by applying a second compression format having a higher compression ratio than the first compression format. Controlling application of the first and the second compression format to each block by means of the first threshold based on a target compression ratio realizes a desired target compression ratio. In consequence, the target compression ratio is reliably realized, which leads to reduction in buffer capacity of the second data storage. Moreover, avoiding excessive application of the second compression format having a higher compression ratio than the first compression format minimizes image degradation due to compression and thus improves image quality.

According to another aspect, the analyzing unit calculates a maximum block number (X) of a group of blocks to be compressed to which the first compression format is applicable, on the basis of a target compression ratio of a frame, calculates a provisional first threshold on the basis of an attribute value of a block of the group of blocks to be compressed, and if X or more blocks have an attribute value larger than or equal to the provisional first threshold, determines an attribute value of a block whose attribute value is the X-th largest among the group of blocks to be compressed to be a nonprovisional first threshold. Thus the first compression format is applied to X blocks having a large attribute value, while the second compression format is applied to the other blocks. In consequence, a target compression ratio is realized while achieving the best possible image quality.

According to another aspect, the group of blocks to be compressed includes luminance and chrominance blocks, and the analyzing unit calculates the maximum block number for a total group of blocks to be compressed aggregating the luminance and chrominance blocks. Since human eyes are more sensitive to changes in luminance than in chrominance and thus higher premium is placed on luminance component, more blocks to which the first compression format needs to be applied are preferably included in luminance blocks than in chrominance blocks. Thus by calculating the maximum block number (X) to which the first compression format is applicable for a total group of blocks to be compressed aggregating luminance and chrominance blocks, the first compression format is applicable to more luminance blocks, and in consequence, image quality is improved.

According to another aspect, the attribute value of the block is a block error. The analyzing unit calculates a provisional first threshold on the basis of an average block error of the group of blocks to be compressed, and if fewer blocks than X have a block error larger than or equal to the provisional first threshold, determines the provisional first threshold to be a nonprovisional first threshold. By employing a block error as an attribute value of the block and setting a first threshold on the basis of an average block error of a group of blocks to be compressed, application of the first and the second compression format is accurately switched, and in consequence, image quality is improved.

According to another aspect, the attribute value of the block is an activity evaluation value. The analyzing unit calculates a provisional first threshold on the basis of an average activity evaluation value of the group of blocks to be compressed, and if fewer blocks than X have an activity evaluation value larger than or equal to the provisional first threshold, determines the provisional first threshold to be a nonprovisional first threshold. By employing an activity evaluation value, which can be calculated by a simple arithmetic, as an attribute value of the block and setting the first threshold on the basis of an average activity evaluation value of a group of blocks to be compressed, a simple way of setting the first threshold is achieved.

According to another aspect, the group of blocks to be compressed includes luminance and chrominance blocks. The analyzing unit separately sets the first threshold of luminance blocks and the first threshold of the chrominance blocks. Thus the first threshold of the luminance blocks can be set at a comparatively small value, so the number of luminance blocks to which the first compression format is applied is increased, while the first threshold of the chrominance blocks can be set at a comparatively large value, so that the number of chrominance blocks to which the first compression format is applied is decreased. In consequence, the first compression format is applicable to more luminance blocks and thus image quality is improved.

According to another aspect, the compression unit adds a remnant number of blocks to a maximum block number of a subsequent group of blocks to be compressed, if the number of blocks to which the first compression format has been applied among a group of blocks to be compressed is smaller than the maximum block number. By carrying forward the remnant number of blocks to the subsequent group of blocks to be compressed, the first compression format is applicable to more blocks of the subsequent group of blocks to be compressed, and in consequence, image quality is improved.

According to another aspect, the first compression format includes a block identifier, a bitmap indicating a pixel value of each pixel in a block, and quantization step value of the block. The bitmap indicating a pixel value of each pixel in a block achieves highly accurate description of a pixel value of each pixel, and in consequence, image quality is improved. Moreover, including the quantization step value of a block achieves setting of an optimal quantization step on a block base, and in consequence, image quality is improved.

According to another aspect, the second compression format includes a block identifier, a higher representative value that represents a pixel value higher than an average pixel value in a block, a lower representative value that represents a pixel value lower than an average pixel value in a block, and a bitmap that indicates which of the higher and the lower representative value is applied to each pixel in the block. The higher and the lower representative value as a substitute for a pixel value of each pixel in the block help reduce the number of bits required, and in consequence, compression ratio is improved.

According to another aspect, the compression unit compresses, among a group of blocks to be compressed, a block having an activity evaluation value smaller than or equal to a second threshold by applying a third compression format having a higher compression ratio than the second compression format, a remaining block having a maximum pixel value in the block smaller than a third threshold by applying a fourth compression format having a compression ratio higher than the second compression format and lower than the third compression format. In this way, the third and the fourth compression format having a comparatively high compression ratio is applied to blocks having a small activity evaluation value or a maximum pixel value. Thus application of the first and the second compression format having a comparatively low compression ratio is distributed to highly necessary blocks, and in consequence, image quality of a whole image is improved.

According to another aspect, the third compression format includes a block identifier that indicates a block to which the third compression format has been applied, and a representative value that represents a pixel value of all pixels in a block. One representative value as a substitute for a pixel value of each pixel in the block and no need for a bitmap help significantly reduce the number of bits required, and in consequence, compression ratio is greatly improved.

According to another aspect, the fourth compression format includes a block identifier that indicates a block to which the fourth compression format has been applied, a higher representative value that represents a pixel value higher than an average pixel value in a block, a lower representative value that represents a pixel value lower than an average pixel value in the block, and a bitmap that indicates which of the higher and the lower representative value is applied to a predetermined pixel extracted from all pixels in the block. The higher and the lower representative value as a substitute for a pixel value of each pixel in the block and a bitmap for a predetermined pixel extracted from all pixels in the block help significantly reduce the number of bits required, and in consequence, compression ratio is improved.

According to another aspect the image processor further includes a decompression unit that decompresses a compressed frame output from the second data storage. The decompressed still picture is thus made available for output, display, or the like.

Some embodiments of the present invention provide an image processor that reliably realize a target compression ratio to reduce buffer capacity, and minimize image degradation due to compression to improve image quality.

DESCRIPTION OF EMBODIMENTS

Embodiments of the present invention are described in detail below referring to the drawings. It should be noted that identical reference numerals throughout the drawings indicate identical or equivalent elements.

FIG. 1 is a block diagram illustrating a configuration of an image processor 1 according to an embodiment of the present invention. FIG. 1 illustrates a relation of connection of the image processor 1 including a color converter 2, a line buffer 3 (first data storage), a compression unit 4, a frame buffer 5 (second data storage), a decompression unit 6, a color converter 7, and an analyzing unit 8.

Figure 2:
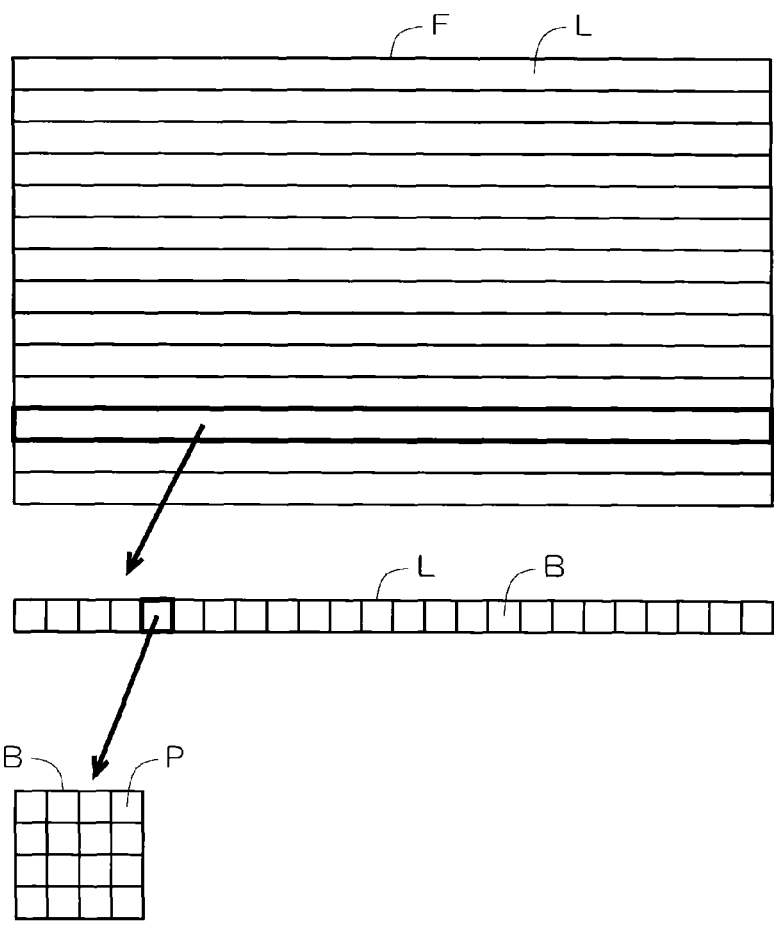
FIG. 2 is a diagram schematically illustrating a frame configuration of a still picture to be compressed by the image processor.

FIG. 2 is a diagram illustrating a frame configuration of a still picture to be compressed by the image processor 1. A frame F of a still picture includes multiple block lines L, each block line L including multiple blocks B. The block B includes multiple pixels P of, for example, 4 columns×4 rows or 8 columns×8 rows. In the example below, each block B includes 16 pixels of 4 columns×4 rows. In this example, for processing an image having pixels of, for example, 1280 columns×720 rows, the frame F includes 720/4=180 block lines L, each block line L including 1280/4=320 blocks B.

In the present embodiment, the bit rate of an image before compression is fixed at a predetermined value (in the example below, 8 bits/pixel). In this example, the bit rate in a block unit is 8×16=128 bits/block. The compression ratio is defined by the ratio of the bit rate of a compressed image to that of the image before compression. For example, when the bit rate of a compressed image is 2 bits/pixel (=32 bits/block), the compression ratio is 1/4.

Figure 3:
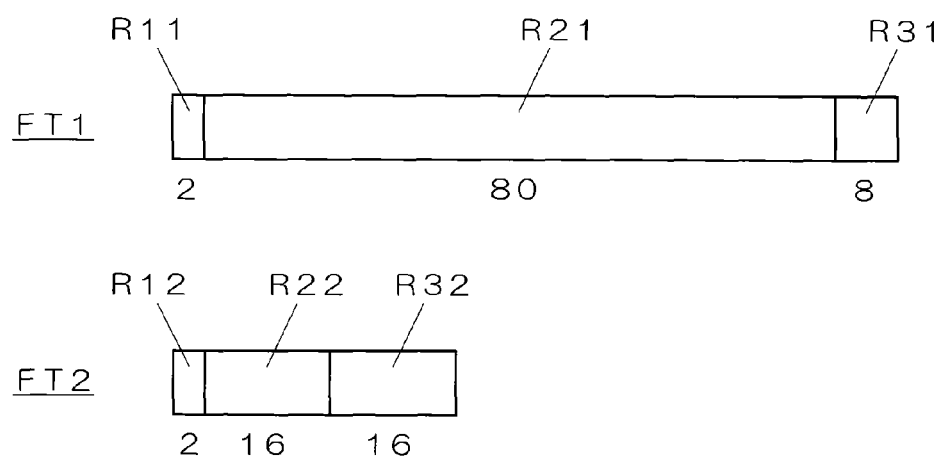
FIG. 3 is a diagram illustrating an example of a compression format of a block compressed by the compression unit.

The compression unit 4 compresses an image in a block unit. FIG. 3 is a diagram illustrating an example of a compression format of a block compressed by the compression unit 4. The compression unit 4 compresses a block to be compressed in either of compression formats FT1 and FT2.

In the example illustrated in FIG. 3, the compression format FT1 is a block having a total of 90-bit length including a region R11 of 2 bits, a region R21 of 80 bits, and a region R31 of 8 bits. That is, a block to which the compression format FT1 is applied is compressed to 90/128 times in bit rate of that before compression. To express 16 pixel values in one block with 90 bits, the bit rate is 90/16=5.63 bit/pixel.

The region R11 contains a block identifier (for example, "11") indicating a block to which the compression format FT1 has been applied. The region R21 contains a bitmap that denotes each pixel value of 16 pixels in a block by 5 bits each. The region R31 contains a quantization step value applied to the block, as a fixed-point real number having 5 bits of an integer part and 3 bits of a fractional part. The region R11 may contain 1 bit of block identifier when there are two types of compression formats.

The compression format FT2 is a block having a total of 34-bit length including a region R12 of 2 bits, a region R22 of 16 bits, and a region R32 of 16 bits. That is, a block to which the compression format FT2 is applied is compressed to 34/128 times in bit rate of that before compression. To express 16 pixel values in one block with 34 bits, the bit rate is 34/16=2.13 bit/pixel.

The region R12 contains a block identifier (for example, "10") indicating a block to which the compression format FT2 has been applied. The region R32 contains an 8-bit higher representative value H and an 8-bit lower representative value L. With pixels having a pixel value higher than or equal to an average M of all pixels in a block being higher pixels, an average pixel value of all higher pixels in the block serves as a higher representative value H. With pixels having a pixel value lower than or equal to the average M being lower pixels, an average pixel value of all lower pixels in the block serves as a lower representative value L. The region R22 contains a bitmap that indicates which of the higher representative value H and the lower representative value L is to be applied to each pixel in the block. In the bitmap, for example, a pixel to which the higher representative value H is to be applied is denoted by "1", and a pixel to which the lower representative value L is to be applied is denoted by "0".

Description is given of an operation of the image processor 1 according to the present embodiment.

<Color Converter 2>

The color converter 2 receives an input of image data D1 (D1R, D1G, D1B) of an RGB color space from an arbitrary communication device such as a camera or a personal computer. The color converter 2 converts the input image data D1 into image data D2 of a YUV color space including luminance Y, chrominance U, and chrominance V (luminance data D2Y, chrominance data D2U, chrominance data D2V) for output, in accordance with the following conversion formula defined in the ITU-R BT.601 standard.

$$Y=0.29891\times R+0.58661\times G+0.11448\times B$$

$$U=-0.16874\times R-0.33126\times G+0.50000\times B$$

$$V=0.50000\times R-0.41869\times G-0.08131\times B$$

<Line Buffer 3>

The line buffer 3 receives an input of the image data D2 from the color converter 2. The line buffer 3 stores the image data D2 in a block line unit for each of the luminance data D2Y, the chrominance data D2U, and the chrominance data D2V. In other words, the line buffer 3 stores a Y block line for the luminance data D2Y, a U block line for the chrominance data D2U, and a V block line for the chrominance data D2V. Since the block size in the example of the present embodiment is 4 columns×4 rows, in order to process an image having pixels of, for example, 1280 columns×720 rows, 1280×4×3=15360 pixel values (960 blocks) as a total of Y, U, and V are stored in the line buffer 3. The Y block line, the U block line, and the V block line stored in the line buffer 3 are the block line to be compressed.

<Analyzing Unit 8>

The analyzing unit 8 receives an input of data D12, which is a target compression ratio (1/G) of a whole frame of the still picture. The analyzing unit 8 calculates a threshold TH1 for switching between the compression formats FT1 and FT2 to be applied to each block, on the basis of the input target compression ratio (1/G).

First processing by the analyzing unit 8 is to obtain a maximum number of blocks (maximum block number X) to which the compression format FT1 is applicable among all blocks aggregating the Y, U, and V block lines included in the block line to be compressed.

The analyzing unit 8 firstly calculates an occupancy rate RT1 of blocks to which the compression format FT1 is applied, on the basis of a bit rate BR1 of the compression format FT1, a bit rate BR2 of the compression format FT2, and the target compression ratio (1/G).

Then the analyzing unit 8 calculates the maximum block number X to which the compression format FT1 is applicable, on the basis of a total number of blocks TB included in the Y, U, and V block lines to be compressed and the occupancy rate RT1 obtained above.

For example, where BR1=90/16, BR2=34/16, 1/G=1/3, and TB=960,

RT1=0.155 and

X=148.

In sum, among a total of 960 blocks aggregating the Y, U, and V block lines, the compression format FT1 is applicable to up to 148 blocks, and the compression format FT2 is to be applied to the rest of the blocks.

Second processing by the analyzing unit 8 is to calculate a provisional threshold TH1' on the basis of an attribute value of each block to be compressed, for each of the Y, U, and V block lines stored in the line buffer 3. Block errors can be employed as the attribute value of the block.

Description is given of a method for calculating a provisional threshold TH1y' for the Y block line, employing a block error.

The analyzing unit 8 firstly calculates the pixel average M, the higher representative value H, and the lower representative value L, for each block included in the Y block line. As described above, the pixel average M is an average pixel value of all pixels in a block, the higher representative value H is an average pixel value of all higher pixels in the block, and the lower representative value L is an average pixel value of all lower pixels in the block.

The analyzing unit 8 then individuality calculates a sum of absolute differences between luminance values of all higher pixels and the higher representative value H and a sum of absolute differences between luminance values of all lower pixels and the lower representative value L, and adds the both sums of absolute differences to calculate a block error P of each block included in the Y block line.

The analyzing unit 8 then adds the block errors P of all blocks included in the Y block line and divides the obtained value by the number of blocks, so as to calculate an average of block errors (average block error $P_{AVE}$) of the Y block line.

The analyzing unit 8 then multiplies the average block error $P_{AVE}$ by a predetermined coefficient α, so as to calculate the provisional threshold TH1y'. The coefficient α for the Y block line is preferably smaller than 1, in order to apply the compression format FT1 to more blocks. If the average block error $P_{AVE}$ is extremely small (in other words, if smaller than a predetermined minimum permissible value), the provisional threshold TH1y' can be set at a first constant value larger than or equal to the minimum permissible value, and similarly, if the average block error $P_{AVE}$ is extremely large (in other words, if larger than a predetermined maximum permissible value), the provisional threshold TH1y' can be set at a second constant value smaller than or equal to the maximum permissible value. The above-described coefficient α, minimum permissible value, maximum permissible value, first constant value, and second constant value are set at an optimal value depending on a desired compression ratio, image quality, and the like.

On completion of calculation of the provisional threshold TH1y', the analyzing unit 8 counts the number of blocks whose block error P is larger than or equal to the provisional threshold TH1y', among all blocks included in the Y block line. Then if the count value is larger than or equal to the maximum block number X, a block whose block error P is the X-th largest among all blocks included in the Y block line is identified and the block error P of the identified block is determined to be a nonprovisional threshold TH1y. On the other hand, if the count value is smaller than the maximum block number X, the provisional threshold TH1y' is determined to be a nonprovisional threshold TH1y.

The analyzing unit 8 also sets the thresholds TH1u and TH1v for the U and the V block line by a method similar to the above. The coefficient α for the U and the V block line, however, is preferably larger than 1, in order to apply the compression format FT1 to as few blocks as possible.

<Compression Unit 4>

The compression unit 4 receives inputs of luminance data D2Y of each block in the Y block line, chrominance data D2U of each block in the U block line, and chrominance data D2V of each block in the V block line from the line buffer 3. The compression unit 4 also receives an input of data D10, which is the maximum block number X and the threshold TH1 (TH1y, TH1u, and TH1v) calculated by the analyzing unit 8, from the analyzing unit 8.

The compression unit 4 sequentially compresses each block in the Y block line in a block unit employing the threshold TH1y, sequentially compresses each block in the U block line in a block unit employing the threshold TH1u, and sequentially compresses each block in the V block line in a block unit employing the threshold TH1v.

If the block error P of the block to be compressed is smaller than the threshold TH1, the compression unit 4 applies the compression format FT2 to compress the block.

Specifically, the compression unit 4 calculates the higher representative value H and the lower representative value L each having 8 bits, on the basis of each pixel value of the block to be compressed.

Then the compression unit 4 writes a block identifier (for example, "10") indicating a block to which the compression format FT2 has been applied in the region R12, a bitmap indicating which of the higher representative value H and the lower representative value L is applied to each pixel in the block in the region R22, and the higher representative value H and the lower representative value L in the region R32, so as to compress the block to be compressed in the compression format FT2.

On the other hand, if the block error P of the block to be compressed is larger than or equal to the threshold TH1, the compression unit 4 applies the compression format FT1 to compress the block.

Specifically, the compression unit 4 calculates a quantization step value Q of the block, on the basis of a maximum pixel value bmax in the block to be compressed.

Then the compression unit 4 divides each pixel value in the block to be compressed by the quantization step value Q, so as to quantize each pixel value.

Then the compression unit 4 writes a block identifier (for example, "11") indicating a block to which the compression format FT1 has been applied in the region R11, a bitmap denoting each quantized pixel value in the region R21, and the quantization step value Q in the region R31, so as to compress the block to be compressed in the compression format FT1.

The compression unit 4 includes a counter, whose initial value is the maximum block number X, for counting the number of blocks to which the compression format FT1 has been applied, the counter value of which is decremented by 1 every time compression employing the compression format FT1 is performed. On completion of compression of all blocks included in a current block line to be compressed, the compression unit 4 inputs data D11, which is the counter value at that time (that is, the remnant number of blocks obtained by subtracting the number of blocks to which the compression format FT1 has been applied from the maximum block number X) to the analyzing unit 8. The analyzing unit 8 employs the number of blocks obtained by adding the remnant number of blocks indicated by the data D11 to a maximum block number (148 blocks in the above example) allotted to a subsequent block line to be compressed as the maximum block number X for the subsequent block line to be compressed.

<Frame Buffer 5>

The frame buffer 5 sequentially receives an input of compressed image data D3 from the compression unit 4. Specifically, compressed luminance data D3Y of each block in the Y block line, compressed chrominance data D3U of each block in the U block line, and compressed chrominance data D3V of each block in the V block line are input in the order of blocks from the compression unit 4.

Compressed image data D3 of all blocks included in all block lines are transferred from the compression unit 4 to the frame buffer 5, so that compressed frame is stored in the frame buffer 5.

<Decompression Unit 6>

The decompression unit 6 sequentially reads the compressed image data D3 from the frame buffer 5. Specifically, the compressed luminance data D3Y of each block in the Y block line, the compressed chrominance data D3U of each block in the U block line, and the compressed chrominance data D3V of each block in the V block line are read from the compression unit 4 in the order of blocks.

The decompression unit 6 refers to the block identifier added to the beginning of the read block to identify which of the compression formats FT1 and FT2 has been applied to each block.

The decompression unit 6 decompresses image data of blocks to which the compression format FT1 has been applied by individually multiplying the pixel value of each pixel in the block in the region R21 by the quantization step value Q in the region R31.

The decompression unit 6 also decompresses image data of blocks to which the compression format FT2 has been applied by adopting the higher representative value H in the region R32 as the pixel value of pixels whose bitmap value in the region R22 is "1", and by adopting the lower representative value L as the pixel value of pixels whose bitmap value is "0".

<Color Converter 7>

The color converter 7 receives an input of image data D4 (D4Y, D4U, and D4V) of a YUV color space from the decompression unit 6. The color converter 7 converts the input image data D4 into the image data D5 (D5R, D5G, and D5B) of an RGB color space for output, by inverse conversion of the above conversion formula defined in the ITU-R BT.601 standard.

<Recapitulation>

According to the image processor 1 of the present embodiment, the analyzing unit 8 sets the threshold TH1 (first threshold) on the basis of a target compression ratio (1/G) of a frame. The compression unit 4 compresses a block having an attribute value larger than or equal to the threshold TH1 by applying the compression format FT1 (first compression format), while compressing a block having an attribute value smaller than the threshold TH1 by applying the compression format FT2 (second compression format) having a higher compression ratio than the compression format FT1. Controlling application of the compression formats FT1 and FT2 to each block by means of the threshold TH1 based on the target compression ratio realizes a desired target compression ratio. In consequence, the target compression ratio is reliably realized, which leads to reduction in buffer capacity of the frame buffer 5 (second data storage). Moreover, avoiding excessive application of the compression format FT2 having a higher compression ratio than the compression format FT1 minimizes image degradation due to compression and thus improves image quality.

According to the image processor 1 of the present embodiment, if X or more blocks have an attribute value larger than or equal to a provisional threshold TH1', the analyzing unit 8 determines an attribute value of the block whose attribute value is the X-th largest among a block line to be compressed (a group of blocks to be compressed) to be a nonprovisional threshold TH1. Thus the compression format FT1 is applied to X blocks having a large attribute value, while the compression format FT2 is applied to the other blocks. In consequence, a target compression ratio is realized while achieving the best possible image quality.

According to the image processor 1 of the present embodiment, the analyzing unit 8 calculates a maximum block number X for a total block line aggregating the Y, U, and V block lines. Since human eyes are more sensitive to changes in luminance than in chrominance and thus higher premium is placed on luminance component, more blocks to which the compression format FT1 needs to be applied are preferably included in luminance blocks than in chrominance blocks. Thus by calculating the maximum number X of blocks to which the compression format FT1 is applicable for a total block line aggregating luminance and chrominance blocks, the compression format FT1 is applicable to more luminance blocks, and in consequence, image quality is improved.

According to the image processor 1 of the present embodiment, the analyzing unit 8 calculates a provisional threshold TH1' on the basis of an average block error of a block line to be compressed (average block error $P_{AVE}$), and if fewer blocks than X have a block error larger than or equal to the provisional threshold TH1', determines the provisional threshold TH1' to be a nonprovisional threshold TH1. By employing a block error as an attribute value of the block and setting the threshold TH1 on the basis of an average block error $P_{AVE}$ of a block line to be compressed, application of the compression formats FT1 and FT2 is accurately switched, and in consequence, image quality is improved.

According to the image processor 1 of the present embodiment, the analyzing unit 8 separately sets the threshold $TH1y$ of a Y block line, the threshold $TH1u$ of a U block line, and the threshold $TH1v$ of a V block line. Thus the threshold $TH1y$ of the Y block line can be set at a comparatively small value, so the number of luminance blocks to which the compression format FT1 is applied is increased, and the thresholds $TH1u$ and $TH1v$ of the U and V block lines can be set at a comparatively large value, so that the number of chrominance blocks to which the compression format FT1 is applied is decreased. In consequence, the compression format FT1 is applicable to more luminance blocks, and thus image quality is improved.

According to the image processor 1 of the present embodiment, if the number of blocks to which the compression format FT1 has been applied among the block line to be compressed is smaller than the maximum block number X, the compression unit 4 adds the remnant number of blocks to a maximum block number of a subsequent block line to be compressed. By carrying forward the remnant number of blocks to the subsequent block line to be compressed, the compression format FT1 is applicable to more blocks of the subsequent block line to be compressed, and in consequence, image quality is improved.

According to the image processor 1 of the present embodiment, the compression format FT1 includes a block identifier, a bitmap indicating a pixel value of each pixel in a block, and a quantization step value Q of the block. The bitmap indicating a pixel value of each pixel in a block achieves highly accurate description of a pixel value of each pixel, and in consequence, image quality is improved. Moreover, including the quantization step value Q of a block achieves setting of an optimal quantization step value Q on a block base, and in consequence, image quality is improved.

According to the image processor 1 of the present embodiment, the compression format FT2 includes a block identifier, a higher representative value H that represents a pixel value higher than an average pixel value in a block, a lower representative value L that represents a pixel value lower than an average pixel value in a block, and a bitmap that indicates which of the higher representative value H and the lower representative value L is to be applied to each pixel in the block. The higher representative value H and the lower representative value L as a substitute for a pixel value of each pixel in the block help reduce the number of bits required, and in consequence, compression ratio is improved.

The image processor 1 of the present embodiment further includes the decompression unit 6 that decompresses a compressed frame output from the frame buffer 5. The decompressed still picture is thus made available for output, display, or the like.

<Modification 1>

Description is given in the above embodiment of employing a block error as an attribute value of the block. As an alternative to a block error, an activity evaluation value may be employed.

Description is given here of a method for calculating a provisional threshold TH1$y'$ for the Y block line, employing an activity evaluation value.

The analyzing unit 8 firstly subtracts a minimum pixel value in a block from a maximum pixel value to calculate an activity evaluation value A of each block included in the Y block line.

The analyzing unit 8 then adds activity evaluation values A of all blocks included in the Y block line and divides the obtained value by the number of blocks, so as to calculate an average of activity evaluation values (average activity evaluation value $A_{AVE}$) of the Y block line.

The analyzing unit 8 then multiplies the average activity evaluation value $A_{AVE}$ by a predetermined coefficient α, so as to calculate the provisional threshold TH1$y'$. The coefficient α for the Y block line is preferably smaller than 1, in order to apply the compression format FT1 to more blocks. If the average activity evaluation value $A_{AVE}$ is extremely small (in other words, if smaller than a predetermined minimum permissible value), the provisional threshold TH1$y'$ can be set at a first constant value larger than or equal to a minimum permissible value, and similarly, if the average activity evaluation value $A_{AVE}$ is extremely large (in other words, if larger than a predetermined maximum permissible value), the provisional threshold TH1$y'$ can be set at a second constant value smaller than or equal to a maximum permissible value. The above-described coefficient α, minimum permissible value, maximum permissible value, first constant value, and second constant value are set at an optimal value depending on a desired compression ratio, image quality, and the like.

On completion of calculation of the provisional threshold TH1$y'$, the analyzing unit 8 counts the number of blocks whose activity evaluation value A is larger than or equal to the provisional threshold TH1$y'$, among all blocks included in the Y block line. Then if the count value is larger than or equal to the maximum block number X, a block whose activity evaluation value A is the X-th largest among all blocks included in the Y block line is identified and the activity evaluation value A of the identified block is determined to be a nonprovisional threshold TH1$y$. On the other hand, if the count value is smaller than the maximum block number X, the provisional threshold TH1$y'$ is determined to be a nonprovisional threshold TH1$y$.

The analyzing unit 8 also sets the thresholds TH1$u$ and TH1$v$ for the U and the V block line by a method similar to the above. The coefficient α for the U and the V block line, however, is preferably larger than 1, in order to apply the compression format FT1 to as few blocks as possible.

In the present modification, if the activity evaluation value A of the block to be compressed is smaller than the threshold TH1, the compression unit 4 applies the compression format FT2 to compress the block, while if the activity evaluation value A is larger than or equal to the threshold TH1, the compression unit 4 applies the compression format FT1 to compress the block.

According to the image processor 1 of the present modification, the analyzing unit 8 calculates a provisional threshold TH1' on the basis of an average activity evaluation value of a block line to be compressed (average activity evaluation value $A_{AVE}$), and if fewer blocks than X have an activity evaluation value larger than or equal to the provisional threshold TH1', determines the provisional threshold TH1' to be a nonprovisional threshold TH1. By employing an activity evaluation value A, which can be calculated by a simple arithmetic, as an attribute value of the block and setting the threshold TH1 on the basis of an average activity evaluation value $A_{AVE}$ of a block line to be compressed, a simple way of setting the threshold TH1 is achieved.

<Modification 2>

Description is given in the above embodiment of employing two compression formats FT1 and FT2. Alternatively, three or more compression formats may be employed. Description is given in the present modification of an example of employing four compression formats FT1 to FT4.

Figure 4:
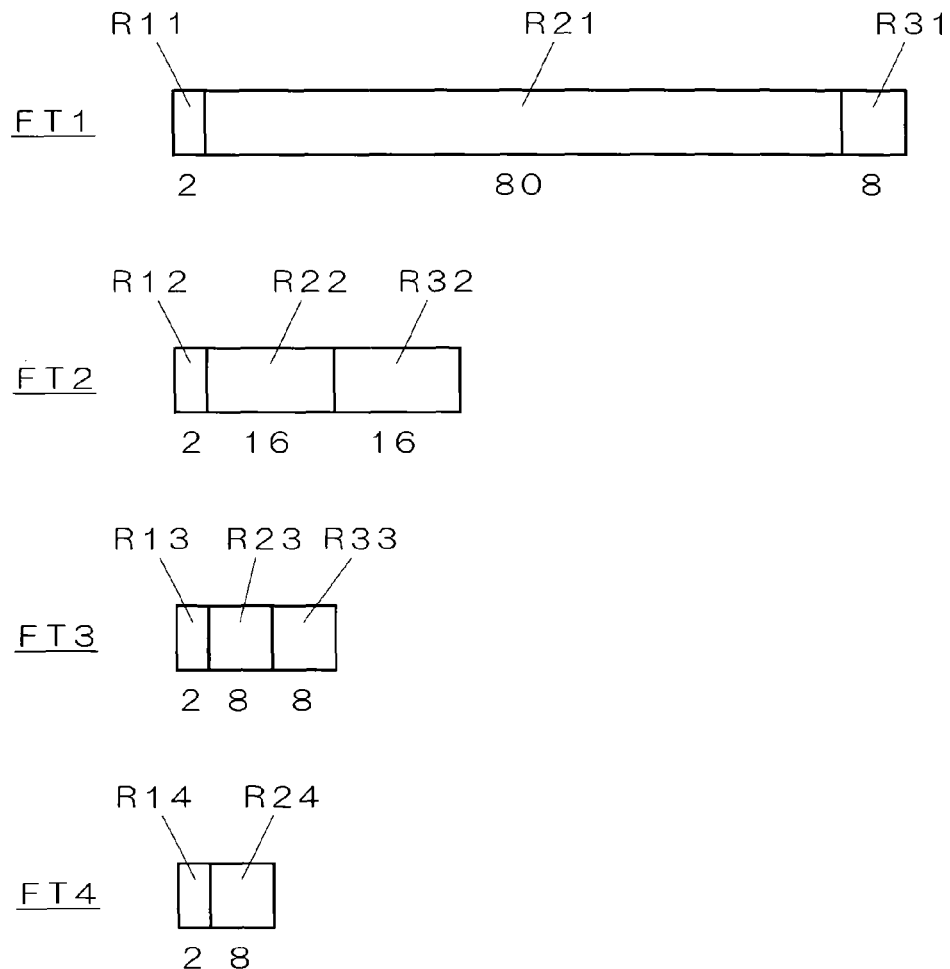
FIG. 4 is a diagram illustrating an example of compression formats of blocks compressed by the compression unit.

FIG. 4 is a diagram illustrating an example of compression formats of blocks compressed by the compression unit 4. The compression unit 4 applies any of compression formats FT1 to FT4 to compress a block to be compressed.

In the example illustrated in FIG. 4, the compression format FT3 is a block having a total of 18-bit length including a region R13 of 2 bits, a region R23 of 8 bits, and a region R33 of 8 bits. That is, a block to which the compression format FT3 is applied is compressed to 18/128 times in bit rate of that before compression. To express 18 pixel values in one block with 16 bits, the bit rate is 18/16=1.13 bit/pixel.

Figure 5:
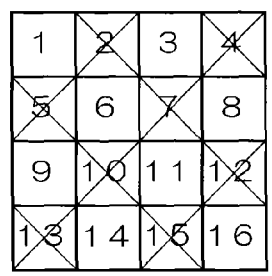
FIG. 5 is a diagram illustrating positions of pixels in a bitmap.

The region R13 contains a block identifier (for example, "01") indicating a block to which the compression format FT3 has been applied. The region R33 contains a higher representative value H and a lower representative value L each having 4 bits. The region R23 contains a bitmap indicating which of the higher representative value H and the lower representative value L is to be applied to a predetermined 8 pixels extracted from all 16 pixels in a block. FIG. 5 is a diagram illustrating positions of pixels in the bitmap. Among all 16 pixels numbered 1 to 16, 8 pixels numbered 1, 3, 6, 8, 9, 11, 14, and 16 (that is, 8 pixels diagonally adjacent to each other) are written in the bitmap.

In the example illustrated in FIG. 4, the compression format FT4 is a block having a total of 10-bit length including a region R14 of 2 bits and a region R24 of 8 bits. That is, a block to which the compression format FT4 is applied is compressed to 10/128 times in bit rate of that before compression. To express 16 pixel values in one block with 10 bits, the bit rate is 10/16=0.625 bit/pixel.

The region R14 contains a block identifier (for example, "00") indicating a block to which the compression format FT4 has been applied. The region R24 contains a representative value that represents a pixel value of all pixels in the block such as a maximum pixel value in the block.

Description is given below of an operation of the image processor 1 according to the present modification, centering on differences from the above embodiments.

<Analyzing Unit 8>

The analyzing unit 8 receives an input of data D12, which is a target compression ratio (1/G) of a whole frame of a still picture. The analyzing unit 8 calculates a threshold TH1 for switching between the compression formats FT1 and FT2 to be applied, on the basis of the input target compression ratio (1/G).

The analyzing unit 8 firstly calculates an occupancy rate RT4 of blocks having an activity evaluation value A smaller than or equal to a predetermined threshold TH2 among all blocks aggregating the Y, U, and V block lines included in a block line to be compressed. In the present modification, the compression format FT4 is applied to such blocks.

The analyzing unit 8 then calculates an occupancy rate RT3 of blocks having an activity evaluation value A larger than the threshold TH2 and a maximum pixel value smaller than a predetermined threshold TH3 among all blocks aggregating the Y, U, and V block lines included in the block line to be compressed. In the present modification, the compression format FT3 is applied to such blocks.

The above-described thresholds TH2 and TH3 are set at an optimal value depending on a desired compression ratio, image quality, and the like.

The analyzing unit 8 then obtains a maximum block number X to which the compression format FT1 is applicable among all blocks aggregating the Y, U, and V block lines included in the block line to be compressed.

The analyzing unit 8 firstly calculates an occupancy rate RT1 of a block to which the compression format FT1 is applied, on the basis of a bit rate BR1 of the compression format FT1, a bit rate BR2 of the compression format FT2, a bit rate BR3 and an occupancy rate RT3 of the compression format FT3, a bit rate BR4 and an occupancy rate RT4 of the compression format FT4, and the target compression ratio (1/G).

Then the analyzing unit 8 calculates the maximum block number X to which the compression format FT1 is applicable, on the basis of a total number of blocks TB included in the Y, U, and V block lines to be compressed and the occupancy rate RT1 obtained above.

For example, where BR1=90/16, BR2=34/16, BR3=18/16, BR4=10/16, 1/G=1/3, TB=960, RT3=0.1, and RT4=0.2, RT1=0.269, and
X=258.

In sum, among a total of 960 blocks aggregating the Y, U, and V block lines, the compression format FT1 is applicable to up to 258 blocks.

In the present modification, the compression format FT4 is applied to blocks having the activity evaluation value A smaller than or equal to the threshold TH2. The compression format FT3 is applied to blocks having the activity evaluation value A larger than the threshold TH2 and the maximum pixel value smaller than the threshold TH3. The compression format FT1 is applied to blocks having the activity evaluation value A larger than the threshold TH2, the maximum pixel value larger than or equal to the threshold TH3, and the attribute value larger than or equal to the threshold TH1. The compression format FT2 is applied to blocks having the activity evaluation value A larger than the threshold TH2, the maximum pixel value larger than or equal to the threshold TH3, and the attribute value smaller than the threshold TH1.

The analyzing unit 8 then calculates a provisional threshold TH1' on the basis of an attribute value of each block to be compressed, for each of the Y, U, and V block lines stored in the line buffer 3. Block error can be employed as the attribute value of the block. Alternatively, similar to the above modification 1, an activity evaluation value can be employed as the attribute value of the block.

Description is given of a method for calculating a provisional threshold $TH1y'$ for the Y block line, employing a block error.

The analyzing unit 8 firstly calculates the pixel average M, the higher representative value H, and the lower representative value L, for each block having an activity evaluation value A larger than the threshold TH2 and a maximum pixel value larger than or equal to the threshold TH3 (hereinafter, "target block") among all blocks included in the Y block line.

The analyzing unit 8 then individually calculates a sum of absolute differences between luminance values of all higher pixels and the higher representative value H and a sum of absolute differences between luminance values of all lower pixels and the lower representative value L, and adds the both sums of absolute differences to calculate a block error P of each target block included in the Y block line.

The analyzing unit 8 then adds the block errors P of all target blocks included in the Y block line and divides the obtained value by the number of target blocks, so as to calculate an average of block errors (average block error $P_{AVE}$) of the Y block line.

The analyzing unit 8 then multiplies the average block error $P_{AVE}$ by a predetermined coefficient α, so as to calculate the provisional threshold $TH1y'$. Similar to the above embodiment, if the average block error $P_{AVE}$ is extremely small, the provisional threshold $TH1y'$ can be set at the first constant value, while if the average block error $P_{AVE}$ is extremely large, the provisional threshold $TH1y'$ can be set at the second constant value.

On completion of calculation of the provisional threshold $TH1y'$, the analyzing unit 8 counts the number of blocks whose block error P is larger than or equal to the provisional threshold $TH1y'$, among all target blocks included in the Y block line. Then if the count value is larger than or equal to the maximum block number X, a block whose block error P is the X-th largest among all target blocks included in the Y block line is identified and the block error P of the identified block is determined to be a nonprovisional threshold $TH1y$. On the other hand, if the count value is smaller than the maximum block number X, the provisional threshold $TH1y'$ is determined to be a nonprovisional threshold $TH1y$.

The analyzing unit 8 also sets the thresholds $TH1u$ and $TH1v$ for the U and the V block line by a method similar to the above.

<Compression Unit 4>

The compression unit 4 receives inputs of luminance data D2Y of each block in the Y block line, chrominance data D2U of each block in the U block line, and chrominance data D2V of each block in the V block line from the line buffer 3. The compression unit 4 also receives an input of data D10, which is the maximum block number X and the thresholds TH1 to TH3 calculated by the analyzing unit 8 from the analyzing unit 8.

If the activity evaluation value A of the block is smaller than or equal to the threshold TH2, the compression unit 4 applies the compression format FT4 to perform compression.

Specifically, the compression unit 4 writes a block identifier (for example, "00") indicating a block to which the compression format FT4 has been applied in the region R14 and the maximum pixel value in the block in the region R24, so as to compress the block to be compressed in the compression format FT4.

If the activity evaluation value A is larger than the threshold TH2 and the maximum pixel value of the block is smaller than the threshold TH3, the compression unit 4 applies the compression format FT3 to perform compression.

Specifically, the compression unit 4 calculates the higher representative value H and the lower representative value L each having 4 bits, on the basis of each pixel value of the block to be compressed.

Then the compression unit 4 writes a block identifier (for example, "01") indicating a block to which the compression format FT3 has been applied in the region R13, a bitmap indicating which of the higher representative value H and the lower representative value L is applied to each of the predetermined 8 pixels extracted from all 16 pixels in the block pixels in the region R23, and the higher representative value H and the lower representative value L each having 4 bits in the region R33, so as to compress the block to be compressed in the compression format FT3.

If the activity evaluation value A is larger than the threshold TH2, the maximum pixel value is larger than or equal to the threshold TH3, and the block error P of the block is smaller than the threshold TH1, the compression unit 4 applies the compression format FT2 to perform compression.

Specifically, the compression unit 4 calculates the higher representative value H and the lower representative value L each having 8 bits, on the basis of each pixel value of the block to be compressed.

Then the compression unit 4 writes a block identifier (for example, "10") indicating a block to which the compression format FT2 has been applied in the region R12, a bitmap indicating which of the higher representative value H and the lower representative value L is applied to each pixel in the block in the region R22, and the higher representative value H and the lower representative value L each having 8 bits in the region R32, so as to compress the block to be compressed in the compression format FT2.

If the activity evaluation value A is larger than the threshold TH2, the maximum pixel value is larger than or equal to the threshold TH3, and the block error P is larger than or equal to the threshold TH1, the compression unit 4 applies the compression format FT1 to perform compression.

Specifically, the compression unit 4 calculates the quantization step value Q of the block, on the basis of a maximum pixel value bmax in the block to be compressed.

Then the compression unit 4 divides each pixel value in the block to be compressed by the quantization step value Q, so as to quantize each pixel value.

Then the compression unit 4 writes a block identifier (for example, "11") indicating a block to which the compression format FT1 has been applied in the region R11, a bitmap denoting each quantized pixel value in the region R21, and the quantization step value Q in the region R31, so as to compress the block to be compressed in the compression format FT1.

The compression unit 4 includes a counter, whose initial value is the maximum block number X, for counting the number of blocks to which the compression format FT1 has been applied, the counter value of which is decremented by 1 every time compression employing the compression format FT1 is performed. On completion of compression of all blocks in a current block line to be compressed, the compression unit 4 inputs data D11, which is the counter value at the time (that is, the remnant number of blocks obtained by subtracting the number of blocks to which the compression format FT1 has been applied from the maximum block number X) to the analyzing unit 8. The analyzing unit 8 employs the number of blocks obtained by adding the remnant number of blocks indicated by the data D11 to a maximum block number calculated for a subsequent block line to be compressed as the maximum block number X for the subsequent block line to be compressed.

<Decompression Unit 6>

The decompression unit 6 sequentially reads the compressed image data D3 from the frame buffer 5. Specifically, the compressed luminance data D3Y of each block in the Y block line, the compressed chrominance data D3U of each block in the U block line, and the compressed chrominance data D3V of each block in the V block line are read from the compression unit 4 in the order of blocks.

The decompression unit 6 refers to the block identifier added to the beginning of the read block to identify which of the compression formats FT1 to FT4 has been applied to each block.

The decompression unit 6 decompresses image data of block to which the compression format FT1 has been applied by individually multiplying the pixel value of each pixel in the block contained in the region R21 by the quantization step value Q contained in the region R31.

The decompression unit 6 also decompresses image data of blocks to which the compression format FT2 has been applied by adopting the higher representative value H in the region R32 as the pixel value of pixels whose bitmap in the region R22 is "1", and by adopting the lower representative value L as the pixel value of the pixels whose bitmap value is "0".

The decompression unit 6 also decompresses the image data of blocks to which the compression format FT3 has been applied by adopting the higher representative value H in the region R33 as the pixel value of the pixels whose bitmap value in the region R23 is "1", and by adopting the lower representative value L as the pixel value of the pixels whose bitmap value is "0". Referring to FIG. 5, for pixels which are not written in the bitmap (pixels indicated by the numbers 2, 4, 5, 7, 10, 12, 13, and 15), an average pixel value of pixels adjacent to these pixels is adopted as a pixel value of these pixels. For example, an average pixel value of the pixel numbered 1 and the pixel numbered 3 is adopted as the pixel value of the pixel numbered 2.

The decompression unit 6 also decompresses image data of blocks to which the compression format FT4 has been applied by adopting the maximum pixel value in the region R24 as the pixel value of all pixels in the block.

According to the image processor 1 of the present modification, the compression unit 4 compresses a block having an activity evaluation value A smaller than or equal to the threshold TH2 (second threshold) by applying the compression format FT4 (third compression format) having a higher compression ratio than the compression format FT2. The compression unit 4 also compresses a block having a maximum pixel value in the block smaller than the threshold TH3 (third threshold) by applying the compression format FT3

(fourth compression format) having a compression ratio higher than that of the compression format FT2 and lower than that of the compression format FT4. In this way, the compression format FT3 or FT4 having a comparatively high compression ratio is applied to blocks having a small activity evaluation value or maximum pixel value. Thus application of the compression formats FT1 and FT2 having a comparatively low compression ratio is distributed to highly necessary blocks, and in consequence, image quality of a whole image is improved.

According to the image processor 1 of the present modification, the compression format FT4 includes a block identifier and a representative value that represents a pixel value of all pixels in a block. One representative value as a substitute for a pixel value of each pixel in the block and no need for a bitmap help significantly reduce the number of bits required, and in consequence, compression ratio is greatly improved.

According to the image processor 1 of the present modification, the compression format FT3 includes a block identifier, a higher representative value H that represents a pixel value higher than an average pixel value in a block, a lower representative value L that represents a pixel value lower than an average pixel value in a block, and a bitmap that indicates which of the higher representative value H and the lower representative value L is to be applied to a predetermined pixel extracted from all pixels in the block. The higher representative value H and the lower representative value L as a substitute for a pixel value of each pixel in the block and a bitmap for a predetermined pixel extracted from all pixels in the block help significantly reduce the number of bits required, and in consequence, compression ratio is improved.

While the invention has been described in detail, the foregoing description is in all aspects illustrative and not restrictive. It is understood that numerous other modifications and variations can be devised without departing from the scope of the invention.

What is claimed is:

1. An image processor configured to compress a still picture with a configuration including a block having a plurality of pixels, a group of blocks having a plurality of blocks, and a frame having a plurality of groups of blocks, the image processor comprising:
    a first data storage configured to sequentially store a group of blocks;
    circuitry configured to
    compress a group of blocks to be compressed stored in the first data storage, and
    analyze the group of blocks to be compressed; and
    a second data storage configured to store a plurality of groups of blocks sequentially compressed by circuitry to store a compressed frame,
    wherein the circuitry is configured to
        set a first threshold on the basis of a target compression ratio of a frame, and compress, among the group of blocks to be compressed, a block having an attribute value larger than or equal to the first threshold by applying a first compression format, and a block having an attribute value smaller than the first threshold by applying a second compression format having a higher compression ratio than the first compression format,
        calculate a maximum block number (X) of the group of blocks to be compressed to which the first compression format is applicable, on the basis of a target compression ratio of a frame,
        calculate a provisional first threshold on the basis of an attribute value of a block of the group of blocks to be compressed, and
        if X or more blocks have an attribute value larger than or equal to the provisional first threshold, determine the attribute value of the particular block whose attribute value is the X-th largest among the group of blocks to be compressed to be a nonprovisional first threshold.

2. The image processor according to claim 1, wherein the group of blocks to be compressed includes a luminance block and a chrominance block, and the circuitry is configured to calculate the maximum block number for a total group of blocks to be compressed aggregating a luminance block and a chrominance block.

3. The image processor according to claim 1, wherein the attribute value of the block is a block error, the circuitry is further configured to
    calculate the provisional first threshold on the basis of an average block error of the group of blocks to be compressed, and
    if fewer blocks than X have a block error larger than or equal to the provisional first threshold, determine the provisional first threshold to be a nonprovisional first threshold.

4. The image processor according to claim 3, wherein the group of blocks to be compressed includes a luminance block and a chrominance block, and wherein the circuitry is further configured to separately set the first threshold of the luminance block and the first threshold of the chrominance block.

5. The image processor according to claim 1, wherein the attribute value of the block is an activity evaluation value, and the circuitry is further configured to
    calculate the provisional first threshold on the basis of an average activity evaluation value of a group of blocks to be compressed, and
    if fewer blocks than X have an activity evaluation value larger than or equal to the provisional first threshold, determine the provisional first threshold to be a nonprovisional first threshold.

6. The image processor according to claim 5, wherein the group of blocks to be compressed includes a luminance block and a chrominance block, and wherein the circuitry is further configured to separately set the first threshold of the luminance block and the first threshold of the chrominance block.

7. The image processor according to claim 1, wherein the circuitry is further configured to add a remnant number of blocks to a maximum block number of a subsequent group of blocks to be compressed, if the number of blocks to which the first compression format has been applied among a group of blocks to be compressed is smaller than the maximum block number.

8. The image processor according to claim 1, the first compression format including
    a block identifier configured to indicate a block to which the first compression format has been applied;
    a bitmap configured to indicate a pixel value of each pixel in a block; and
    a quantization step value of the block.

9. The image processor according to claim 1, the second compression format including
    a block identifier configured to indicate a block to which the second compression format has been applied;

a higher representative value configured to represent a pixel value higher than an average pixel value in a block;

a lower representative value configured to represent a pixel value lower than the average pixel value in the block; and a bitmap configured to indicate which of the higher representative value and the lower representative value is applied to each pixel in the block.

10. The image processor according to claim 1, wherein the circuitry is further configured to compress, among the group of blocks to be compressed, a block having an activity evaluation value smaller than or equal to a second threshold by applying a third compression format having a higher compression ratio than the second compression format, compress a remaining block having a maximum pixel value in the block smaller than a third threshold by applying a fourth compression format having a compression ratio higher than the second compression format and lower than the third compression format, and compress a further remaining block having an attribute value larger than or equal to the first threshold by applying the first compression format and a further remaining block having an attribute value smaller than the first threshold by applying the second compression format.

11. The image processor according to claim 10 the third compression format including a block identifier configured to indicate a block to which the third compression format has been applied; and a representative value configured to represent a pixel value of all pixels in a block.

12. The image processor according to claim 10, the fourth compression format including a block identifier configured to indicate a block to which the fourth compression format has been applied;

a higher representative value configured to represent a pixel value higher than an average pixel value in a block;

a lower representative value configured to represent a pixel value lower than an average pixel value in the block; and a bitmap configured to indicate which of the higher representative value and the lower representative value is applied to a predetermined pixel extracted from all pixels in the block.

13. The image processor according to claim 1, wherein the circuitry is further configured to decompress a compressed frame output from the second data storage.

14. A method of compressing a still picture with a configuration including a block having a plurality of pixels, a group of blocks having a plurality of blocks, and a frame having a plurality of groups of blocks, the method comprising:

storing, sequentially in a first data storage a group of blocks;

compressing by circuitry, a group of blocks to be compressed stored in the first data storage;

analyzing the group of blocks to be compressed;

storing in a second data storage, a plurality of groups of blocks sequentially compressed by circuitry to store a compressed frame, wherein a first threshold is set on the basis of a target compression ratio of a frame, and the circuitry is configured to compress, among the group of blocks to be compressed, a block having an attribute value larger than or equal to the first threshold by applying a first compression format, and a block having an attribute value smaller than the first threshold by applying a second compression format having a higher compression ratio than the first compression format;

calculating by circuitry a maximum block number (X) of the group of blocks to be compressed to which the first compression format is applicable, on the basis of a target compression ratio of a frame;

calculating a provisional first threshold on the basis of an attribute value of a block of the group of blocks to be compressed; and determining, if X or more blocks have an attribute value larger than or equal to the provisional first threshold, the attribute value of a block whose attribute value is the X-th largest among the group of blocks to be compressed to be a nonprovisional first threshold.

* * * * *